(12) United States Patent
West et al.

(10) Patent No.: US 9,568,035 B2
(45) Date of Patent: Feb. 14, 2017

(54) FASTENER JOINT WITH SEALING GASKET

(71) Applicant: Airbus Operations Limited, Bristol (GB)

(72) Inventors: Colin John West, Bristol (GB); David Alistair Sutton, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 272 days.

(21) Appl. No.: 13/744,054

(22) Filed: Jan. 17, 2013

(65) Prior Publication Data
US 2013/0125375 A1 May 23, 2013

Related U.S. Application Data

(62) Division of application No. 12/680,911, filed as application No. PCT/GB2008/050968 on Oct. 20, 2008, now abandoned.

(30) Foreign Application Priority Data

Oct. 23, 2007 (GB) .................................. 0720705.3

(51) Int. Cl.
F16J 15/14 (2006.01)
F16B 19/00 (2006.01)
(Continued)

(52) U.S. Cl.
CPC .......... *F16B 19/008* (2013.01); *F16B 33/004* (2013.01); *F16B 43/001* (2013.01); *F16J 15/14* (2013.01);
(Continued)

(58) Field of Classification Search
CPC ..... F16B 33/004; F16B 43/001; F16B 19/008; Y10S 411/915; F16J 15/14
(Continued)

(56) References Cited

U.S. PATENT DOCUMENTS 2,383,570 A 8/1945 Sellew
2,718,691 A 9/1955 Sussenbach
(Continued)

FOREIGN PATENT DOCUMENTS

EP 1548083 6/2005
EP 1567774 9/2006
(Continued)

OTHER PUBLICATIONS

International Search Report for PCT/GB2008/050968 dated Jan. 27, 2009.
British Search Report for GB0720705.3 dated Feb. 14, 2008.

*Primary Examiner* — Kristina Fulton
*Assistant Examiner* — Nicholas L Foster
(74) *Attorney, Agent, or Firm* — Hauptman Ham, LLP

(57) ABSTRACT

A joint comprising: a first component having a face and a bore defined by a bore wall; a second component; a fastener joining the first component to the second component, the fastener comprising a head and a shaft protruding from the head; and a polysulphide gasket comprising a ring which is compressed between the head of the fastener and the face of the first component; and a collar between the shaft of the fastener and the bore wall. The gasket comprises a ring of sealing material surrounding a hole for receiving a fastener, the sealing material comprising an at least partially cured polysulphide sealant. The gasket has a region of increased thickness positioned towards the inner periphery of the ring which flows to form the collar.

7 Claims, 4 Drawing Sheets

(51) Int. Cl.
*F16B 33/00* (2006.01)
*F16B 43/00* (2006.01)

(52) U.S. Cl.
CPC ......... *Y10T 29/49947* (2015.01); *Y10T 403/52* (2015.01)

(58) Field of Classification Search
USPC .......................... 277/316, 648, 649, 650, 651
See application file for complete search history.

(56) References Cited

U.S. PATENT DOCUMENTS

| | | | |
|---|---|---|---|
| 2,760,400 A * | 8/1956 | Mills et al. ................ 411/371.1 |
| 2,853,330 A | 9/1958 | Harry |
| 2,884,098 A * | 4/1959 | Hutchison ............ F16B 19/008 |
| | | | 220/681 |
| 2,914,149 A * | 11/1959 | Walker ................... B65D 90/08 |
| | | | 220/565 |
| 2,981,651 A * | 4/1961 | Arnold .......................... 411/542 |
| 3,022,870 A | 2/1962 | John et al. |
| 3,184,769 A * | 5/1965 | Barwood ............ F16B 43/001 |
| | | | 411/369 |
| 3,247,752 A | 4/1966 | Greenleaf et al. |
| 3,399,589 A * | 9/1968 | Breed ................... F16B 33/004 |
| | | | 264/268 |
| 3,494,243 A | 2/1970 | Kleinhenn |
| 3,659,896 A | 5/1972 | Smith et al. |
| 3,803,972 A * | 4/1974 | Deutsher ............... F16B 33/004 |
| | | | 411/337 |
| 3,837,657 A | 9/1974 | Farnam et al. |
| 3,936,059 A | 2/1976 | Gordon |
| 4,070,219 A | 1/1978 | Farnam |
| 4,280,390 A * | 7/1981 | Murray ................ F16B 43/001 |
| | | | 411/542 |
| 4,310,273 A * | 1/1982 | Kirrish .......................... 411/338 |
| 4,810,454 A | 3/1989 | Belter |
| 5,141,375 A | 8/1992 | Pollizzi |
| 5,390,939 A | 2/1995 | Terauchi et al. |
| 5,639,103 A | 6/1997 | Jeanne et al. |
| 6,530,575 B2 | 3/2003 | Poquet et al. |
| 6,626,439 B1 | 9/2003 | Forry et al. |
| 7,063,327 B2 | 6/2006 | Salameh |
| 7,425,604 B2 | 9/2008 | Cosman et al. |
| 7,708,281 B2 | 5/2010 | West |
| 7,900,412 B2 | 3/2011 | West et al. |
| 8,602,764 B2 * | 12/2013 | Hutter, III ..................... 425/175 |
| 8,651,413 B2 * | 2/2014 | Kashiwagi et al. .......... 244/1 A |
| 2002/0010223 A1 | 1/2002 | Botrie |
| 2003/0015278 A1 | 1/2003 | Fisher et al. |
| 2005/0144874 A1 | 7/2005 | West et al. |
| 2006/0192342 A1 | 8/2006 | West |

FOREIGN PATENT DOCUMENTS

| | | |
|---|---|---|
| GB | 889887 | 2/1962 |
| GB | 1166988 | 10/1969 |
| GB | 1253020 | 11/1971 |
| WO | 2004051096 | 6/2004 |

\* cited by examiner

FASTENER JOINT WITH SEALING GASKET

The present application is a divisional of U.S. application Ser. No. 12/680,911, filed Mar. 31, 2010 and is national phase of PCT/GB2008/050968, filed Oct. 20, 2008, and claims priority from, British Application Number 0720705.3, filed Oct. 23, 2007, the disclosures of which are hereby incorporated by reference herein in their entirety.

FIELD OF THE INVENTION

The present invention relates to a joint with a sealing gasket, a gasket for use in such a joint, and a method of manufacturing such a joint.

BACKGROUND OF THE INVENTION

EP 1548083 A1 describes a sealing material for use in sealing joints. The sealing material comprises an at least partially cured polysulphide sealant and a reinforcing element. The sealing material is provided in the form of a sheet of uniform thickness. The sheet is placed between the mating surfaces of the components in the manner of a gasket, and the components are then fastened together, for example with rivets or bolts.

While the sealing material will to some degree move away from the fasteners as they are tightened, the curing of the sealant material and the presence of the reinforcing element will, in general, prevent the sealing material from moving entirely away from the vicinity of the fasteners.

U.S. Pat. No. 3,022,870 describes a fastener joint with a self-sustaining adherent polysulphide film forming a fluid-tight seal between a pair of metal plates.

SUMMARY OF THE INVENTION

A first aspect of the invention provides a joint comprising: a first component having a face and a bore defined by a bore wall; a second component; a fastener joining the first component to the second component, the fastener comprising a head and a shaft protruding from the head; and a polysulphide gasket comprising a ring which is compressed between the head of the fastener and the face of the first component; and a collar between the shaft of the fastener and the bore wall.

A second aspect of the invention provides a method of manufacturing a joint, the method comprising:
mounting a gasket on a fastener; the fastener comprising a head and a shaft protruding from the head, and the gasket comprising an at least partially cured polysulphide sealing material;
inserting the shaft of the fastener through a first component and at least partially through a second component until the gasket engages the first component; and
compressing the gasket between the head of the fastener and the first component whereby the sealing material flows along the shaft of the fastener and forms a collar between the shaft of the fastener and the first component.

In contrast with the gaskets in EP 1548083 A1 and U.S. Pat. No. 3,022,870, in which the sealant material forms a seal between the mating pairs of components, the gasket of the present invention forms a collar between the shaft of the fastener and the bore wall.

Preferably the collar of the gasket engages both the shaft of the fastener and the bore wall.

Preferably the collar of the gasket forms a bond with the shaft of the fastener and/or the bore wall.

Preferably the ring forms a bond with the head of the fastener and the face of the first component.

The head of the fastener may comprise a non-tapered button-head, or more preferably the bore comprises a tapered opening and the head of the fastener comprises a tapered head which is received in the tapered opening.

The gasket may be un-reinforced, or more preferably the gasket further comprises a reinforcing element such as a fabric. Typically the gasket comprises a matrix-rich region which contains a lower than average density of reinforcement, for instance on an outer surface of the gasket.

Any suitable reinforcing material may be used, for example glass, carbon, aramid, metal (especially stainless steel) or polyamide.

To protect the structure of an aircraft in the event of a lightning strike, the electrical conductivity through the structure and across joints needs to be controlled. This is also important to ensure the safe dissipation of static electricity. In the case of sealed joints, there is a requirement to prevent voids between the fastener and the structure which can be heated by high electrical currents, expand and cause damage to the surrounding structure.

The current solution for sealing and protecting structure from lightning strike is to prevent air voids by using wet assembled sealed joints and to provide a low impedance path between two surfaces or parts, usually through the use of bonding leads. However, bonding leads can fail (break) creating a spark hazard, which is unacceptable particularly in areas of the aircraft containing fuel vapour. Moreover, a large space envelope is required to install and maintain bonding leads.

Optionally the polysulphide material forming the gasket may be loaded with conductive particles. In this case the gasket will provide an element of protection from lightning strike by forming an electrical path between the components without air voids. The conductive particles may comprise carbon black or metals such as silver. However carbon black may not be sufficiently conductive and silver will reduce the mechanical properties of the polysulphide, especially when at higher concentrations. Therefore most preferably the conductive particles are carbon nanotubes.

Optionally the reinforcing material may also be formed by a conductive fabric, such as metal, for purposes of lightning protection.

In order to increase the sealing material that flows along the shaft of the fastener, the gasket may have a region of increased thickness towards its inner periphery. This region may extend only partly round the circumference of the ring (for instance in a series of discrete locations) or may extend around the entire circumference of the ring. Typically the region of increased thickness includes a matrix-rich protrusion which contains a lower than average density of reinforcement.

A further aspect of the invention provides a gasket for sealing a fastener joint, the gasket comprising a ring of sealing material surrounding a hole for receiving a fastener, the sealing material comprising an at least partially cured polysulphide sealant with a region of increased thickness positioned towards the inner periphery of the ring.

The gasket is specially adapted for use in the first and second aspects of the invention, since the region of increased thickness provides the necessary material to flow along the shaft of the fastener.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
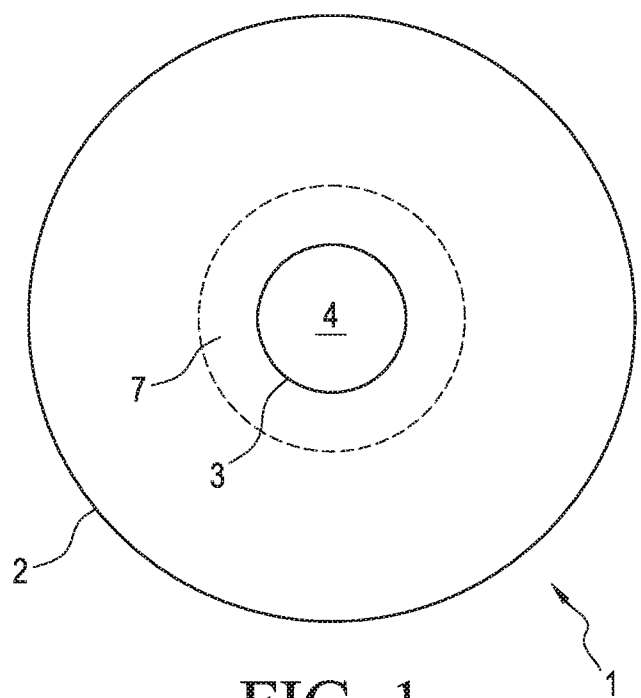
FIG. 1 is a plan view of a gasket.
Figure 2:
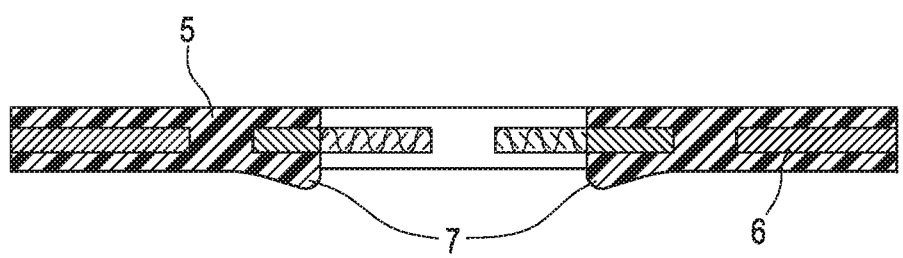
FIG. 2 is a cross-section through the gasket.
Figure 3:
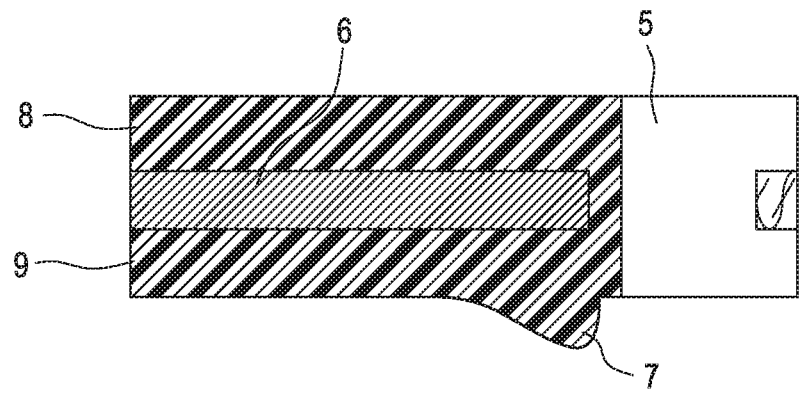
FIG. 3 is an enlarged cross-section through part of the gasket.

A gasket 1 shown in FIGS. 1-3 comprises a ring of sealing material with an outer periphery 2, and an inner periphery 3 surrounding a hole 4.

The sealing material comprising an at least partially cured polysulphide sealant 5, and a layer of fabric reinforcement 6 shown in cross-section in FIGS. 2 and 3. The gasket has a ring-shaped protrusion 7 which is positioned towards the inner periphery 3 of the ring, and extends around the entire circumference of the ring as shown in FIG. 1. The protrusion 7 contains substantially none of the reinforcing fabric as shown in FIGS. 2 and 3.

The gasket is manufactured by the following process. First, a paste of polysulphide material is mixed with a curing agent such as manganese dioxide. Various suitable sealant materials are described in EP 1548083 A1, the contents of which is incorporated herein by reference. By way of example, the material may comprise Chemetall MC238-A1/2 or PRC-De Soto International PR1770C12. Optionally the paste of polysulphide material may be filled with conductive particles, most preferably carbon nanotubes, for purposes of lightning protection.

A woven cloth of glass-fibre is then impregnated with the polysulphide sealant by a conventional calendering process. The calendering process produces matrix-rich regions 8,9 shown in FIG. 3. Then the sheet is stamped to cut out the ring-shaped profile of the gasket which is placed between a pair of mould tools shaped to give the required shape to the protrusion 7. The ring is compressed between the mould tools and heated to a lightly raised temperature (no greater than 60° C.) to fully or partially cure the polysulphide material. Completion of the curing process may occur before or after assembly of the joint.

Figure 4:
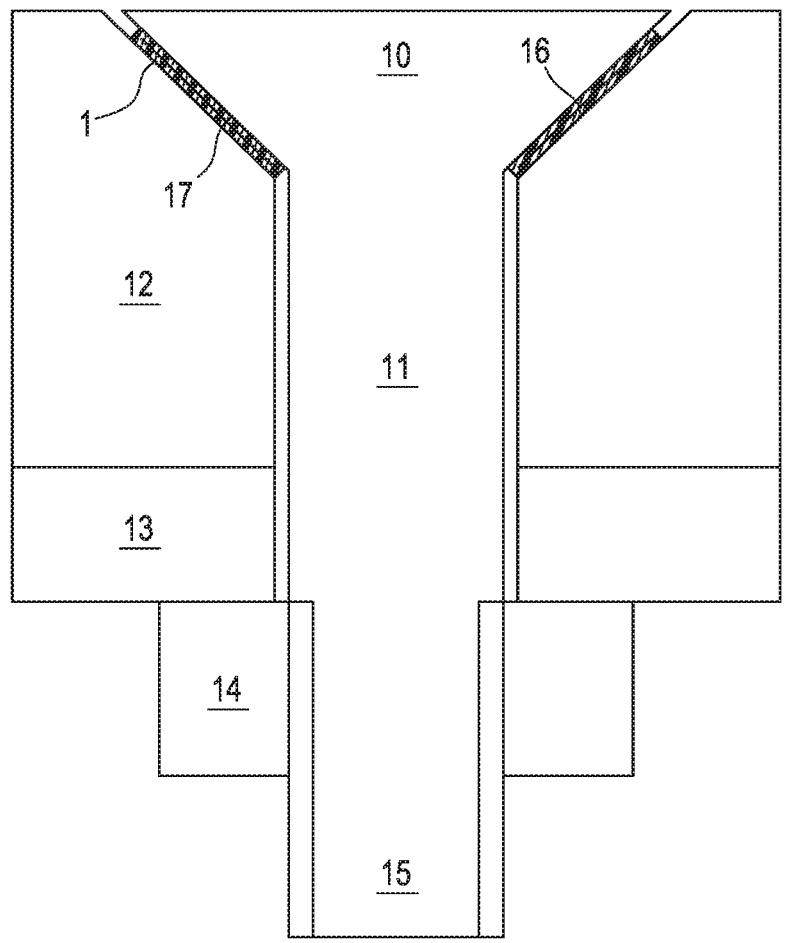
FIG. 4 is a cross-sectional view of a joint on an aircraft, before the sealant material has flowed along the shaft of the bolt.
Figure 5:
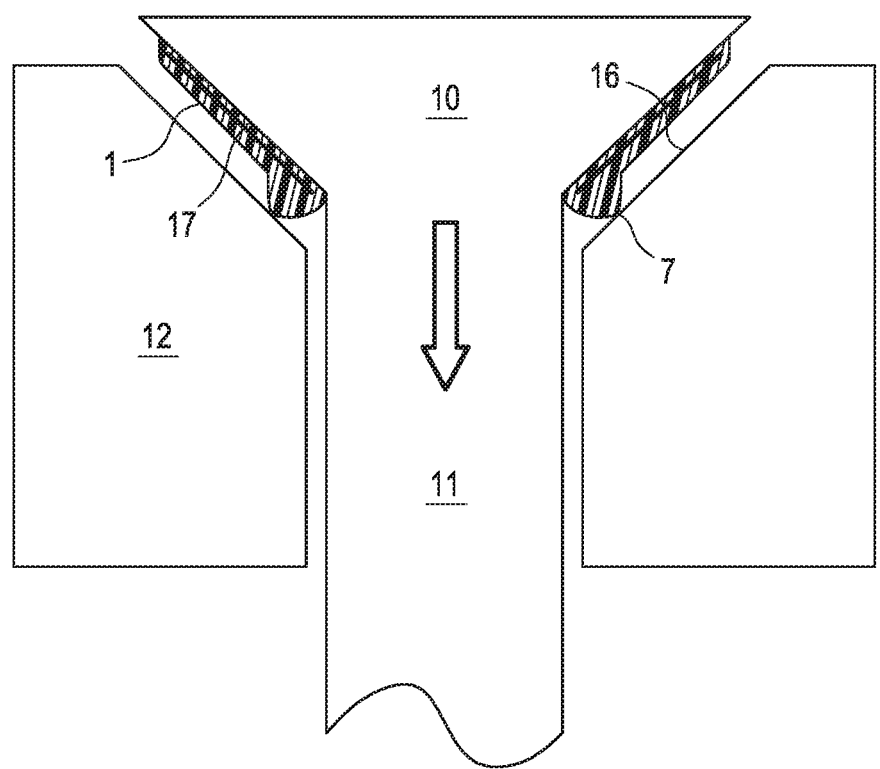
FIG. 5 shows the bolt being pushed into the joint.
Figure 6:
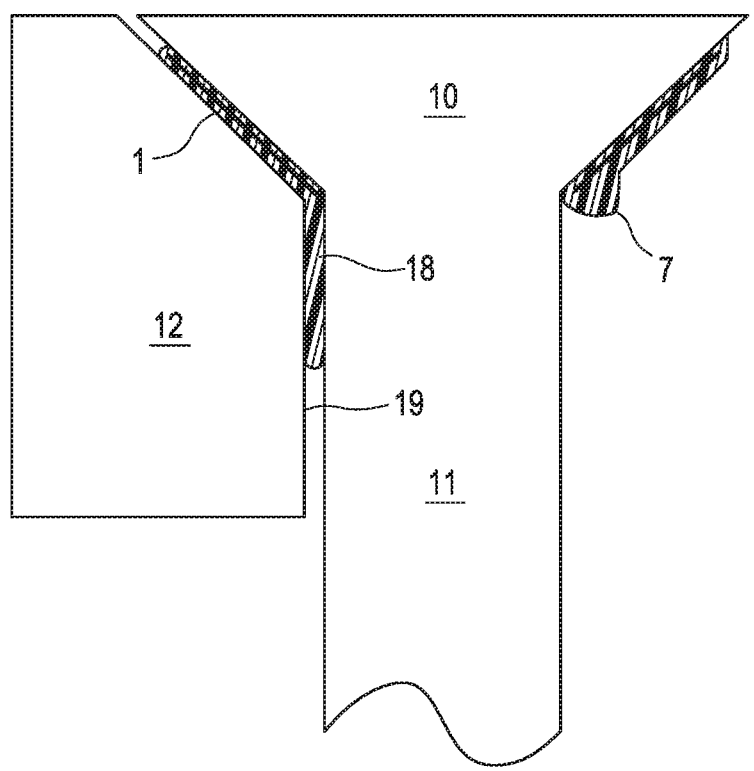
FIG. 6 shows the joint after the sealant material has flowed along the shaft of the bolt.

A method of sealing a fastener joint with the gasket 1 is shown in FIGS. 4-6. First, the gasket 1 is mounted on the tapered head 10 of a bolt. The shaft 11 of the bolt is then passed through a pair of components 12, 13 as shown in FIG. 4, and a nut 14 is screwed onto the threaded distal end 15 of the shaft 11. As the nut is screwed tight, the gasket engages a tapered opening 16 in the first component 12 as shown in FIG. 5. At this point the gasket is un-deformed. As the nut is tightened further; the gasket 1 becomes compressed between the tapered head 10 of the bolt and the wall of the tapered opening 16. Unexpectedly, this pressure causes the polysulphide sealing material in the matrix-rich regions 8,9 and the protrusion 7 to flow along the shaft 11 of the fastener to form a cylindrical collar 18 between the shaft 11 and the wall of the cylindrical bore 19 in the first component 12 as shown in the left-hand side FIG. 6. The right-hand side of FIG. 6 shows the gasket in its un-flowed state, for comparison purposes. This can be contrasted with gaskets formed with polytetrafluoroethylene (PTFE) which tend to flow outwardly instead of flowing along the shaft 11.

Conceivably, if the first component 12 is thin then the sealing material may flow as far as the second component 13. After a period of time, the sealing material bonds to the opposing surfaces of the tapered head 10, tapered opening 16, shaft 11 and the wall of the cylindrical bore 19 to form a fluid-tight seal.

Although the invention has been described above with reference to one or more preferred embodiments, it will be appreciated that various changes or modifications may be made without departing from the scope of the invention as defined in the appended claims.

The invention claimed is:

1. A joint comprising: a first component having a face and a bore defined by a bore wall, the bore having a tapered opening; a second component; a fastener joining the first component to the second component, the fastener comprising a tapered head and a shaft protruding from the head; and a gasket being substantially disk-shaped before installation, the gasket comprising a fully or partially cured polysulphide sealing material, a fabric impregnated with the sealing material and only a single protrusion which is positioned towards an inner periphery of the gasket and which contains substantially none of the fabric, wherein during assembly of the joint the shaft of the fastener is inserted through the first component and at least partially through the second component, and the sealing material of the gasket engages and is compressed between the head of the fastener and the tapered opening of the first component such that the protrusion engages the tapered opening before the gasket is compressed between the shaft of the fastener and the first component, whereby the sealing material in the protrusion flows along the shaft of the fastener and forms a collar between the shaft of the fastener and the bore wall.

2. The joint of claim 1, wherein the tapered head of the fastener is received in the tapered opening of the bore.

3. The joint of claim 1, wherein the sealing material forming the gasket is loaded with conductive particles.

4. An aircraft comprising a joint according to claim 1.

5. A method of manufacturing a joint, the method comprising:
mounting a substantially disk-shaped gasket on a fastener; the fastener comprising a tapered head and a shaft protruding from the tapered head, and the gasket comprising a fully or partially cured polysulphide sealing material which is in contact with the head of the fastener, wherein the gasket further comprises a fabric impregnated with the sealing material, and a protrusion which is positioned towards an inner periphery of the gasket and contains substantially none of the fabric;
inserting the shaft of the fastener through a first component and at least partially through a second component until the sealing material of the gasket engages the first component;
compressing the gasket between the tapered head of the fastener and a tapered opening of the first component whereby the sealing material in the protrusion flows along the shaft of the fastener and forms a collar between the shaft of the fastener and the first component; and,
wherein the protrusion engages the tapered opening of the first component before the gasket is compressed between the tapered head of the fastener and the first component.

6. The method of claim 5 wherein the protrusion extends around the entire circumference of the gasket.

7. The method of claim 5 wherein the polysulphide sealing material is filled with conductive particles.

* * * * *